S. G. WINGQUIST AND N. A. PALMGREN.
ROLLER BEARING.
APPLICATION FILED MAR. 18, 1920.

1,356,326.

Patented Oct. 19, 1920.
2 SHEETS—SHEET 1.

INVENTOR.
S. G. Wingquist
BY N. A. Palmgren
Rogers, Kennedy & Campbell
ATTORNEYS.

S. G. WINGQUIST AND N. A. PALMGREN.
ROLLER BEARING.
APPLICATION FILED MAR. 18, 1920.

1,356,326.

Patented Oct. 19, 1920.

2 SHEETS—SHEET 2.

INVENTOR.
S. G. Wingquist
BY N. A. Palmgren
Rogers, Kennedy & Campbell
ATTORNEYS.

UNITED STATES PATENT OFFICE.

SVEN GUSTAF WINGQUIST AND NILS ARVID PALMGREN, OF GOTTENBORG, SWEDEN, ASSIGNORS TO AKTIEBOLAGET SVENKA KULLAGERFABRIKEN, OF GOTTENBORG, SWEDEN, A CORPORATION OF SWEDEN.

ROLLER-BEARING.

1,356,326.      Specification of Letters Patent.      Patented Oct. 19, 1920.

Application filed March 18, 1920. Serial No. 366,856.

*To all whom it may concern:*

Be it known that we, SVEN GUSTAF WINGQUIST and NILS ARVID PALMGREN, subjects of the King of Sweden, residing at Gottenborg, in the Kingdom of Sweden, have invented certain new and useful Improvements in Roller-Bearings, of which the following is a specification, reference being had therein to the accompanying drawings.

The present invention relates to a roller bearing which is provided with a pressure flange on one of the races of the bearing, said pressure flange serving to prevent movement of the rollers in their axial direction, and the invention has for its purpose to provide a bearing in which said pressure flange simultaneously serves as a guide for the rollers so that said rollers are prevented from occupying oblique positions. For this purpose the invention is principally characterized by this that the bearing surface of the pressure flange for the rollers and the surfaces of the rollers bearing against the flange, are spherically shaped in such manner that there will be contact between said surfaces at least in two points located one after another in the direction of rolling. In this manner the rollers are reliably guided, and no special guide flange is required for this purpose, so that the construction of the bearing is thus materially simplified.

In the accompanying drawings, Figures 1 to 10 incl. show ten different embodiments of the invention, all figures showing sections through the axis of the bearing.

Figure 1:
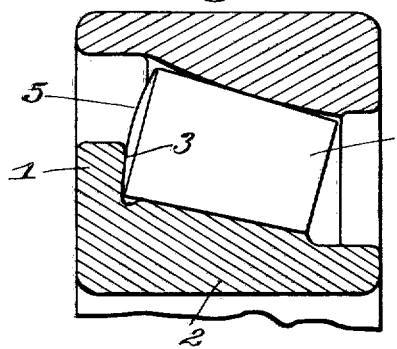
Figure 2:
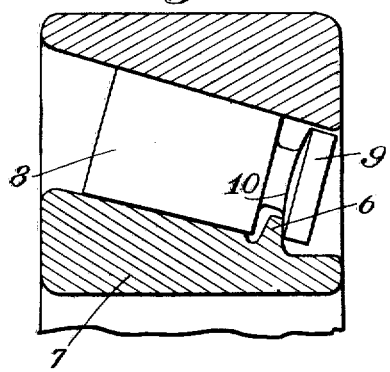
Figure 3:
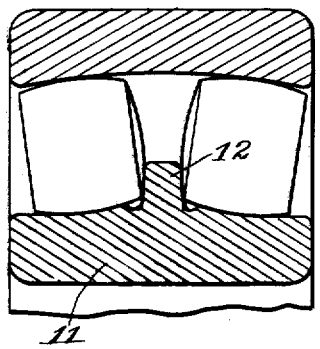
Figure 4:
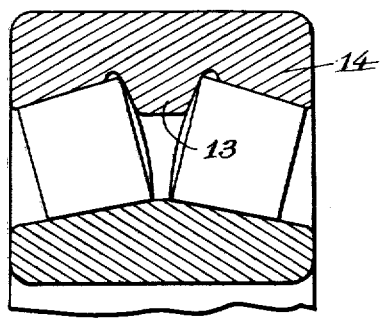
Figure 5:
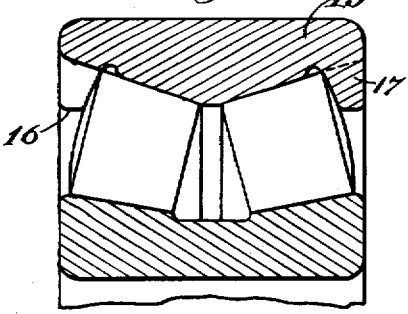
Figure 6:
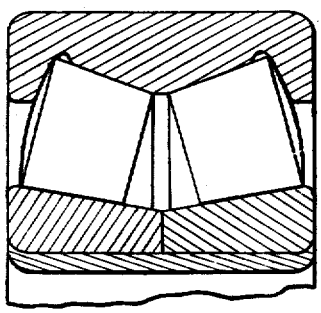
Figure 7:
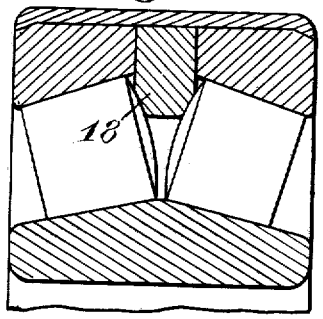
Figure 8:
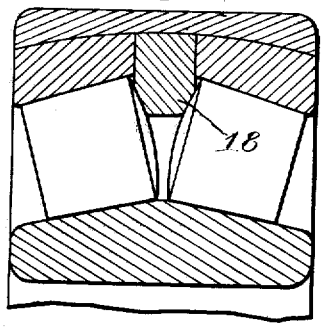
Figure 9:
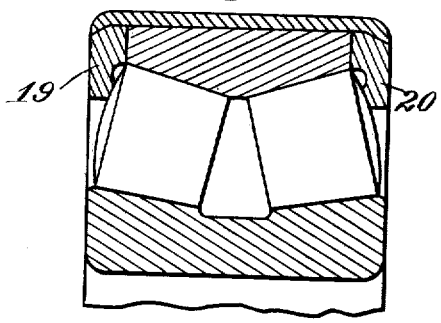
Figure 10:
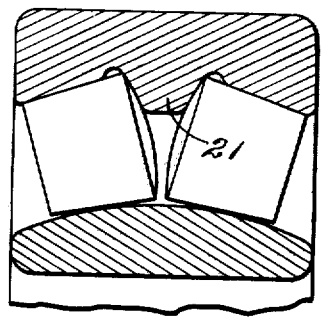

In all the embodiments illustrated the ordinary pressure flange is provided with a spherical bearing surface—or with two such surfaces in the case of a two-row bearing having the pressure flange located between the rows of rollers—against which surface a corresponding spherical surface on each roller bears, so that there will be contact over a surface which will thus always have a certain extension in the rolling direction. Otherwise these embodiments differ from one another only as regards the location and the arrangement of the pressure flange. According to Fig. 1 the pressure flange 1 is provided on the inner race 2 and is made integral with the same and provided with a spherical bearing surface 3 against which the roller 4 bears with its spherical end surface 5 of its larger end. In the embodiment illustrated in Fig. 2 the pressure flange 6 is also provided on the inner race 7, but the roller 8 is provided with a special head 9 on which the spherical surface 10 bearing against the pressure flange is provided. Fig. 3 shows a two-row bearing having a pressure flange 12 on the inner race 11, which flange is common to both rows of rollers and for this purpose provided with a spherical bearing surface on either side, and Fig. 4 shows a bearing with a similar pressure flange 13 provided, however, on the outer flange 14. According to Fig. 5 the outer race 15 is provided with a separate pressure flange 16 and 17 for each row of rollers, which is also the case in the bearing according to Fig. 6 which is provided, however, with a divided inner race in order to avoid the necessity of providing filling openings in the pressure flanges. According to Figs. 7 and 8 there is provided, as in Fig. 4, a pressure flange 18 common to both rows of rollers, but in this case said flange is not made integral with the outer race but it is inserted between the two portions of the divided outer race. The bearing according to Fig. 9 differs from the one illustrated in Fig. 5 only in that the two pressure flanges 19 and 20 on the outer race are made as separate parts, while the bearing according to Fig. 10 corresponds to the bearings shown in Fig. 4 as regards the arrangement of the common pressure flange 21.

It will be noted that as shown in the drawings the spherical surface of the flange in each of the different forms of the bearings illustrated, is generated from a point located in the axis of rotation of the bearing as a center.

We do not claim herein broadly a roller bearing having on one of its races a flange formed with a spherical surface arranged to contact with coöperating spherical surfaces on the rollers, as that feature is claimed broadly in the application of N. A. Palmgren, Serial No. 330,402.

We claim:

1. In a roller bearing, the combination of an inner race, an outer race, rollers, and a pressure flange on one of said races bearing against and preventing said rollers from moving in their axial direction, the bearing surface on said flange for the rollers being spherical, and the surface on each roller bearing against said surface on said flange being correspondingly spherical, so that there is contact between said surfaces over a surface.

2. In a roller bearing, the combination of an inner race, an outer race, two series of rollers, and a pressure flange on one of said races arranged between the two series of rollers and provided with bearing surfaces against which the ends of the rollers of the two series bear and are limited in their axial movements toward each other, the bearing surfaces on said flange being spherical, and the surface on each roller bearing against said surfaces on the flange being correspondingly spherical so that there is contact between said surfaces over a surface.

3. A roller bearing according to claim 1 characterized by the fact that one of the races is spherical and that the pressure flange is on the other race.

4. A roller bearing according to claim 1 characterized by the fact that the spherical race is on the outer race ring, and the pressure flange is on the inner race.

5. A roller bearing according to claim 1 characterized by the fact that the spherical bearing surface of the pressure flange thereing recited, is generated from a point located in the axis of rotation of the bearing as a center.

6. In a roller bearing, the combination of an inner race, an outer race, rollers, and a combined pressure and guiding flange on one of said races bearing against the rollers and serving both to prevent said rollers from moving in their axial direction and from assuming oblique positions, the bearing surface on said flange being spherical and the coöperating surface on each roller being correspondingly spherical so as to provide surface contact between said parts.

SVEN GUSTAF WINGQUIST.
NILS ARVID PALMGREN.

It is hereby certified that the assignee in Letters Patent No. 1,356,326, granted October 19, 1920, upon the application òf Sven Gustaf Wingquist and Nils Arvid Palmgren, of Gottenborg, Sweden, for an improvement in "Roller-Bearings," was erroneously described and specified as "Aktiebolaget Svenka Kullagerfabriken," whereas said assignee should have been described and specified as *Aktiebolaget Svenska Kullagerfabriken*, as shown by the record of assignments in this office; in the printed specification, page 2, line 24, claim 3, for the word and numeral "claim 1" read *claim 2;* same page, line 28, claim 4, for the word and numeral "claim 1" read *claim 3;* and that the said Letters Patent should be read with these corrections therein that the same may conform to the record of the case in the Patent Office.

Signed and sealed this 30th day of November, A. D., 1920.

[SEAL.]

L. B. MANN,
*Acting Commissioner of Patents.*

Cl. 64—39.